(12) United States Patent
Buckley et al.

(10) Patent No.: US 9,407,444 B2
(45) Date of Patent: Aug. 2, 2016

(54) METHOD FOR VALIDATING MESSAGES

(71) Applicants: BlackBerry Limited, Waterloo (CA); Certicom Corp., Mississauga (CA)

(72) Inventors: Michael Eoin Buckley, Grayslake, IL (US); Robert John Lambert, Cambridge (CA); Nevine Maurice Nassif Ebeid, Kitchener (CA)

(73) Assignees: Certicom Corp., Mississauga, Ontario (CA); BlackBerry Limited, Waterloo, Ontario (CA)

( * ) Notice: Subject to any disclaimer, the term of this patent is extended or adjusted under 35 U.S.C. 154(b) by 14 days.

(21) Appl. No.: 14/220,983

(22) Filed: Mar. 20, 2014

(65) Prior Publication Data

US 2015/0270975 A1    Sep. 24, 2015

(51) Int. Cl.
    H04L 29/06    (2006.01)
    H04L 9/32     (2006.01)
    H04W 12/10    (2009.01)
    H04W 12/12    (2009.01)

(52) U.S. Cl.
    CPC ............ H04L 9/3247 (2013.01); H04L 9/3263 (2013.01); H04L 63/126 (2013.01); H04L 63/14 (2013.01); H04W 12/10 (2013.01); H04W 12/12 (2013.01)

(58) Field of Classification Search
    CPC ............................ H04L 9/3247; H04L 9/3263
    USPC ........................................................ 713/156
    See application file for complete search history.

(56) References Cited

U.S. PATENT DOCUMENTS

2012/0246465 A1*  9/2012  Little et al. ................. 713/156

FOREIGN PATENT DOCUMENTS

JP    2014011735 A  *  1/2014  ............ H04L 63/12
WO   2014007172          1/2014

OTHER PUBLICATIONS

NTT docomo (PWS Replay Protection, Jul. 9-13, 2012, S3-120749, 16 pages).*
Hapsari et al., Mobile communication method and mobile terminal, WO2014007172A1, machine translation, 15 pages.*
Machine translation of JP2014011735(A), 8 pages.*
International Search Report and Written Opinion of the International Searching Authority issued in International Application No. PCT/US2015/021765 on Jul. 3, 2015; 10 pages.
3GPP TR 33.869 V0.7.0; 3rd Generation Partnership Project; Technical Specification Group Services and System Aspects; Study on Security Aspects of Public Warning System (PWS) (Release 12); Jan. 2014; 98 pages.

* cited by examiner

*Primary Examiner* — Saleh Najjar
*Assistant Examiner* — Oleg Korsak
(74) *Attorney, Agent, or Firm* — Fish & Richardson P.C.

(57) ABSTRACT

There is provided a method for secure communications. The method includes a computing device receiving a notification comprising a message, a counter value, a signature signed by a signer and based on the message and the counter value, and an indication of the signer. The device obtains a current counter value based on an identity of the signer, checks the signature and compares the counter value with the current counter value; and, if the counter comparison and the signature checking is successful, accepting the message.

22 Claims, 7 Drawing Sheets

Figure 5

METHOD FOR VALIDATING MESSAGES

FIELD OF THE DISCLOSURE

The present disclosure relates to secure communications, and in particular to validating messages.

BACKGROUND

Cryptographic techniques (whether based on symmetric key cryptography, or asymmetric key cryptography or both) have been used in various systems and networks to secure both data and messages. The appropriate choice of cryptographic primitives in a specific context may depend on various factors, such as for example, computational resource constraints or threat models.

Warning messages are a particular type of message that have been used to provide timely and accurate alerts, warnings and critical information regarding disasters and other emergencies. Examples of warning messages include the Public Warning System (PWS) messages described in the context of the Third Generation Partnership Project (3GPP). PWS provides a framework for Korean Public Alert System (KPAS), European Warning System (EU-ALERT), and Commercial Mobile Alert System (CMAS) messages which may fall into three classes: Presidential; Imminent Threat and Child Abduction Emergency; and Earthquake and Tsunami Warning System (ETWS) messages.

The structure, syntax and protocol for warning messages are typically determined by regulatory requirements. Often warning messages are constructed to be robust and compact, to facilitate communication of important information during a bandwidth constrained situation, either due to physical constraints imposed on a communications network, or due to event-based traffic that results in higher than normal traffic over the network.

Warning messages may include multiple components; for example, the warning message may include a description of the event, the geographical area affected by the event, a recommended action, an expiration time for the warning message; and the identity of an agency responsible for the warning message.

There is a general interest to enhance the reliability, resiliency, and security of messages, and in particular, warning messages to enable the public to take appropriate action to protect their families and themselves from serious injury, or loss of life or property. Therefore, the transmission of messages over communication networks may require that certain security requirements be met. For example, security requirements for notifications may include any one or more of the following: (a) the integrity of the messages is protected; (b) the communication network will protect against false messages; and (c) only messages from authorized and authenticated sources will be transmitted via the communication network. Such security requirements may serve to minimize the reception of false messages that may reduce the effectiveness of the messaging system, and in the case of warning messages, false messages may reduce the effectiveness of the network as users become less responsive. False messages may also cause confusion, hazardous conditions and/or widespread panic.

The security requirements for messages may be subject to regulatory policies and may also vary from region to region. An example of security requirements for notifications such as warning messages may be found in the requirements for Public Warning System (PWS) messages broadcast in 3GPP, as specified in the document, 3GPP TS 22.268 v11.2.0, "Public Warning System (PWS) requirement (Release 11)".

In addition to the security requirements, messages may also be associated with certain latency requirements which require the messages to be of limited size. For example, the Earthquake and Tsunami Warning System (ETWS) being standardized may contain a requirement that warning messages transmitted in these systems have a latency of less than 4 seconds from broadcast to receipt by an end computing device. Such requirements may ensure that messages are received by users in a timely fashion. Such latency and/or other requirements may place a size constraint limiting a number of bits used for the messages and/or any associated fields (e.g., security bits).

Furthermore, due to the heterogeneous nature of large communication systems, it is often difficult to ensure time synchronization between each and every broadcast server sending messages, and recipient communication devices. Accordingly, the security and size requirements of the messages must further accommodate the need to differentiate between currently broadcast and previously broadcast messages.

A malicious intermediary attempting to disrupt communications may intercept an original broadcast and retransmit the broadcast at a later point in time to execute a "replay attack". Similarly, out of date servers on the network may 'innocently' forward out of date messages. In order to forestall replay attacks or simple errors, it is desirable to distinguish between current and previously broadcast messages in order to reduce false positive message receipts by users.

Communication networks should be designed to ensure that the security and latency requirements for these messages are satisfied while ensuring minimal bandwidth overhead and minimal resource consumption both in the core network and in the radio interface. In addition, the network design may have to ensure that legacy communication devices on the network are also able to process notifications, so as to avoid liability caused due to users of such legacy devices not being aware of notifications. The network design may also have to account for mobile devices that may roam from one network to another.

DESCRIPTION OF DRAWINGS

Embodiments will now be described by way of example only, with reference to the attached drawings in which.

Like reference numerals and designations in the various drawings indicate like elements.

DETAILED DESCRIPTION

In an implementation, a method is provided for of accepting a notification, the method comprising: receiving the notification, the notification containing a message, a counter value, a signature, and an indication of a signer; processing the indication to obtain a signer identity corresponding to the signer; obtaining, based on the signer identity, a previously stored current counter value associated with the signer; comparing the counter value with the current counter value; and accepting the received notification based upon the comparison.

In an aspect of the method, the counter value comprises a certificate counter value, and wherein the indication comprises the certificate counter value and a certificate authority identity corresponding to the certificate authority that generated the certificate counter value, and wherein the stored current counter value is further associated with the certificate authority identity, and wherein the method further comprises: processing the indication to obtain the certificate authority identity; and, wherein the obtaining the current counter value comprises obtaining, based on the signer identity and the certificate authority identity, the previously stored current counter value.

In an aspect of the method, the counter value comprises a message counter value and the current counter value comprises a current message counter value, and wherein the indication further comprises an indication counter value and a certificate authority identity, wherein the obtaining further comprises obtaining, based on the signer identity and the certificate authority identity, a previously stored current indication counter value associated with the signer identity and the certificate authority identity; and wherein the comparing further comprises comparing the indication counter value with the current indication counter value.

The aspect may further comprise the comparing confirming that the message counter is greater than the current message counter, and confirming that the indication counter is greater than or equal to the current indication counter.

In an aspect of the method, the counter value comprises a message counter value.

In an aspect of the method, the processing the indication to obtain a signer identity comprises processing the indication to obtain public key information associated with the signer, and wherein the obtaining, based on the signer identity, comprises obtaining based on the public key information.

In an aspect of the method, when the notification is accepted: processing the indication to obtain public key information; and verifying the signature using the public key information to authenticate the notification.

The aspect may further comprise discarding the notification if the signature is not verified.

In an aspect the method may further comprise discarding the notification if the received notification is not accepted.

In an aspect of the method, the indication comprises a certificate or an implicit certificate.

In an aspect of the method, the comparing the counter value and the current counter values comprises verifying that the counter value is equal to or greater than the current counter value.

In an aspect the method may further comprise, if the comparison fails, discarding the notification.

In an aspect of the method, the comparing the counter value and the current counter values comprises verifying that the counter value is greater than the current counter value.

The aspect may further comprise, if the comparison fails, discarding the notification.

In an aspect of the method, the certificate is an ECQV implicit certificate.

In an aspect of the method, the signature is one of a keyed MAC signature, DSA signature, and an ECDSA signature.

In an aspect of the method, when the received notification is accepted based upon the comparison, the method further comprising replacing the current counter value with the received counter value.

In an aspect of the method, the received notification is a warning message.

In an aspect of the method, after the received notification is accepted, the method further comprising: communicating the message to a user.

In an aspect of the method, when the counter value fails the comparison with the current counter value, the method further comprises discarding the received notification.

In an aspect the method may further comprise, if the comparison fails, communicating the message to a user, and including a flag identifying the comparison failure.

In an aspect the method may further comprise, if the comparison fails, communicating the message to a user, and including a flag identifying the comparison failure.

In an aspect the method may further comprise, communicating the message to a user with a differential flag identifying a state of the counter value, as determined by the comparison.

A computing device including a processor and memory operative to execute the any of the above methods.

A software program product comprising a non-transitory machine readable medium comprising instructions that when executed on a processor of a computing device enable the computing device to perform any of the above methods.

Figure 1:
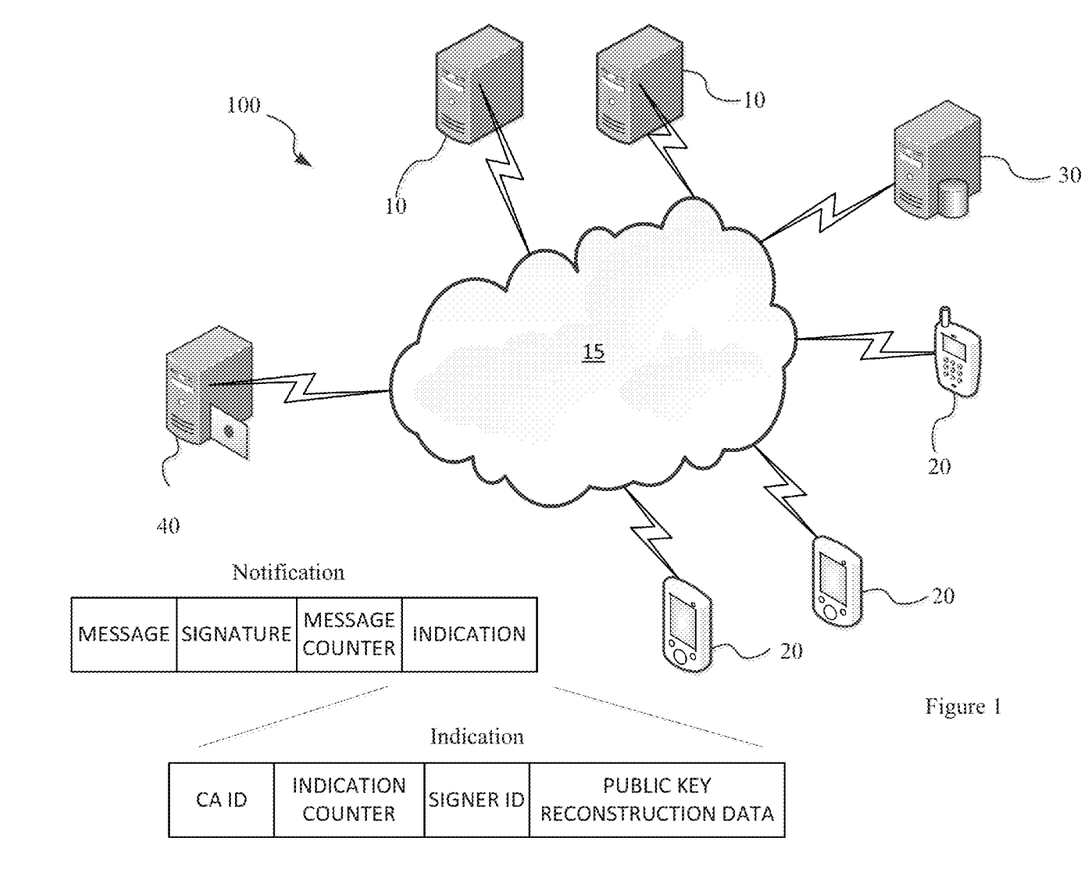
FIG. 1 illustrates an exemplary embodiment of a communication system for transmitting secure notifications.

Referring to FIG. 1, a representative schematic of an exemplar broadcast model for broadcasting notifications, each containing a message, is illustrated. In the example of FIG. 1, a representative communication system 100 composed of one or more source servers 10, each operative to generate a message for broadcast through a communications network 15 to at least one of a plurality of recipient devices 20.

As will be appreciated, the communications network 15 may comprise a common network, such as the public Internet, or may comprise a combination of separate networks, such as a private network between the source servers 10 and a network server 30, a public network connecting the network server 30 to a private mobile network of a communications provider that provides connectivity to the recipient devices 20.

In some implementations, a source server 10 is operative to process the message into a notification containing the message, and to broadcast the notification to the recipient devices 20. In other implementations, the source server 10 is operative to forward the message to a network server 30 that is operative to process the message into the notification containing the message, and to broadcast the notification over the communications network 15 to the plurality of recipient devices 20.

In some implementations, the communication system 100 may use asymmetric key cryptography techniques to provide integrity and authentication protection for notifications transmitted to the one or more communication devices 20. In the implementation of FIG. 1, the communication system 100 includes at least one certificate authority server (CA) 40, to issue certificates that can be authenticated to confirm an identity of the notification sender.

The CA 40, the communication devices 20, the source servers 10, and the network servers 30 can communicate with each other and with other components of the communication system 100 over the network 15. In the example shown in FIG. 1, the message signer (whether a source server 10 or a network server 35) can send a certificate request to the CA 40, and the CA 40 can respond by sending a certificate. The server 10 or 30 can send a signature of the message and certificate to the communication devices 20, and the communication device 20 can verify the signature using the certificate issued by the CA 40. The communication system 100 can support additional or different types of communication. In some implementations, the communication devices 20 and the servers 10, 30 may also exchange encrypted messages and other types of information with each other, and with the CA 40. For example, a CA 40 may generate key pairs for the message signers 10, 30, and may send the private key to the servers 10 or 30 using an encrypted channel.

The CA 40 is a computing system that can perform operations of a CA in a cryptography system. The CA 40 is generally operable to receive, transmit, process, and store information associated with the cryptography system. Although FIG. 1 shows a single CA 40, a CA can be implemented using multiple CAs 40, including server clusters, as well as additional or different types of computing devices other than servers.

The communication system 100 can include additional, fewer, or different components. For example, the communication system 100 may include additional storage devices, additional servers (including additional certificate authority servers), additional communication devices, and other features not shown in the figure.

In the embodiment of FIG. 1, the CA 40 may issue certificates that bind an identity of a message 'owner', for instance the message signer that signed a warning message using a private key, to a corresponding public key. A communication device 20 can utilize public key information of the CA 40 to verify this binding of the identity and the public key, prior to verifying the signature of the warning message. Necessary public information for processing the certificate (e.g., the CA's public key) may be provisioned to the communication devices 20 (and any servers optionally) either on manufacturing or in communication with a fixed root address. As only the CA 40 is aware of the CA's private key, the certificates may be distributed using an open channel as opposed to other solutions that may require a secure channel for the distribution of the public key.

In an implementation, a recipient of a signed message may obtain additional confirmation that the message is a valid message, by comparing one or more counters included as part of the message with a corresponding one or more current counters stored by the recipient.

As shown in FIG. 1, in an implementation the original message may be processed into a notification comprising a message, message counter value, signature, and indication of the message signer (e.g. a certificate, or an implicit certificate, which may constitute the security information of the message) for transmission to the communication device 20. In some implementations, the single transmission comprises at least a portion of the original message. In some implementations, the single transmission also comprises the entirety of the original message.

The recipient communication device 20 relies upon validating the signature to confirm that the message is a valid message originally generated by a source server 10 associated with the indication of the message signer, and relies upon the message counter value to confirm that this is an up to date warning message, and not out of date as would be the case in a replay attack.

In another implementation also illustrated in FIG. 1, the indication may further include its own indication counter value that is associated with that indication. Accordingly, the recipient relies upon validating the signature to confirm that the message is a valid message originally generated by a source server 10 associated with the indication of the message signer, and relies upon the indication counter value to confirm that this is an up to date indication, and not out of date as would be the case in a replay attack.

In an implementation, both the message counter and the indication counter are present, and the computing device may evaluate both the message counter value and the indication counter value to confirm that this is a valid up to date warning message that includes a valid up to date indication.

In the 3GPP context for warning messages, this single transmission may be implemented as Cell Broadcast Service (CBS) data. Section 9.3 of 3GPP TS 23.401 v11.0.0: "General Packet Radio Service (GPRS) enhancements for Evolved Universal Terrestrial Radio Access Network (E-UTRAN) access", for example, notes that the CBS message consists of at least some of several parameters including the warning message and the security information.

Figure 2:
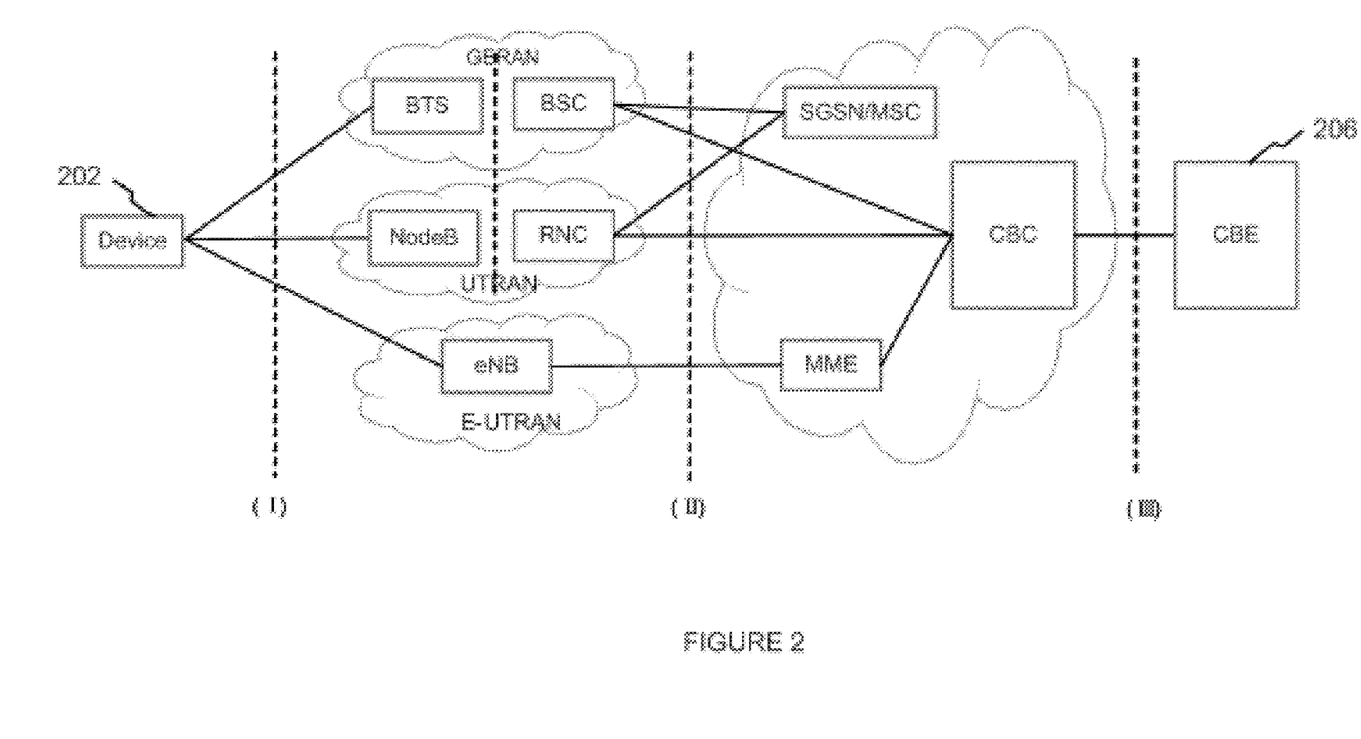
FIG. 2 illustrates an exemplary network that allows for transmission of the warning messages from the Cell Broadcast Entity (CBE) to the communication device using various nodes in the core and access networks.

FIG. 2 shows an exemplary Public Warning System (PWS) architecture (presented in 3GPP TR 33.869) that allows for such a single transmission of a notification to a communication device 202. The architecture of FIG. 2 is included by way of example only, and other network architectures utilizing one or more of various radio network technologies may be used instead.

PWS is an umbrella for several emergency warning systems, such as weather, earthquake, etc. Due to the broad distribution of warning messages, it is desirable to ensure the integrity and security of the warning messages to avoid misuse of the system. The security requirement is primarily on account of the air interface between the communication devices and the access network where the warning messages are broadcast to the devices. The Cell Broadcast Centre (CBC) server is part of the core network and connects to the appropriate network node. For GSM Radio Access Network (GERAN), the CBC server connects with the Base Station Controller (BSC) in the access network; for Universal Terrestrial Radio Access Network (UTRAN), the CBC server connects with the Radio Network Controller (RNC) in the access network; and for Evolved Universal/UMTS Terrestrial Radio Access Network (E-UTRAN), the CBC server connects with the Mobile Management Entity (MME) in the core network. The Cell Broadcast Entity (CBE) server 206 is external to the access and core networks and may be responsible for all aspects of formatting the Cell Broadcast Service (CBS), which is transmitted to the communication device 202 using the CBC server and associated network nodes. The transmission of the warning messages to the communication device 202 are achieved using the Base Transceiver Station (BTS), Node B or the evolved-Node B in GERAN, UTRAN and E-UTRAN respectively.

In some scenarios, the warning messages may be broadcast to all communication devices (even those that may be in idle mode) within a geographical region, with no requirement of an acknowledgement from the communication devices.

The PWS may specify a specific latency requirement for warning messages, in order to ensure timely delivery of the messages to all communication devices. These latency requirements may entail that the warning messages and/or associated data fields (e.g., security information including the signature and the certificate) be subject to size constraints. Required security levels may place a requirement on the size of the public keys being used and thus, the associated certificates and the generated signatures. In general then, warning messages are typically subject to stringent size constraints, in order to ensure they are actually received in a timely fashion in order to alert recipients of an event.

One proposal for improving the security of warning messages is to include an implicit certificate based approach.

Under this approach, a message signer periodically obtains an implicit certificate from a certificate authority (CA), and includes the implicit certificate as part of the security message portion of a message such as a warning message. The implicit certificate, combined with the CA's public key, results in the message signer's public key. A recipient is able to verify the signature using the message signer's public key.

Since messages and implicit certificates are typically time limited, the security system relies upon the communication devices 20 being able to also confirm the validity of the message, or implicit certificate, based upon a timestamp or other measure. A particular problem faced by warning message systems, is that using timestamps to date either the certificate or the message is undesirable as it requires synchronization between the CA 40, the message signer, and the recipient communication device 20. If the synchronization fails, otherwise valid warning messages would be rejected by the recipient communication device 20.

Including some form of time limitation is desirable to prevent replay attacks. A replay attack occurs when a third party intercepts a valid transmission, and either repeats or delays transmission of the valid message to the recipients. In the context of a PWS, a replay could also be caused inadvertently by a malfunctioning server repeatedly broadcasting an expired message.

Under both scenarios, the receipt and acceptance of expired messages by recipient devices can risk the integrity of the PWS. Users may be initially confused, and incorrectly take corrective action for an event that is not occurring, or may ignore future messages if they lose faith in the authenticity and timeliness of messages that they receive. As noted above, use of a timestamp with an implicit certificate approach is a valid method for avoiding replay attacks. A particular problem faced in the context of PWS, however, is ensuring synchronization across all of the devices in the system.

In an implementation, a notification includes a message counter is used to provide additional information to allow a recipient to confirm that the message is up to date. In addition to the message counter, the notification includes sufficient information for a recipient communication device to classify and authenticate the message counter based upon at least an identity of the message signer. As may be appreciated, due to the size constraints placed on warning messages, it is desirable to minimize the amount of security information included with the message, and still allow the recipient communication device to classify and authenticate the message counter. In an aspect the notification includes identifying information within an indication portion of the notification. In an aspect, the identifying information may comprise public key reconstruction data, as illustrated in FIG. 1.

In an implementation, an indication counter is used to provide additional information to allow a recipient to confirm that the indication (e.g. a certificate or an implicit certificate) is up to date. In addition to the indication counter, the message includes sufficient information for a recipient communication device to classify and authenticate the indication counter based upon at least both an identity of the message signer and an identity of the CA that was used to provide a certificate for that message. As may be appreciated, due to the size constraints placed on warning messages, it is desirable to minimize the amount of security information included with the message, and still allow the recipient communication device to classify and authenticate the indication counter.

Referring again to FIG. 1, the servers such as the source servers 10, network servers 30, and the CA 40, generally include a data processing apparatus, a data storage medium, and a communication interface. The memory can include, for example, a random access memory (RAM), a storage device (e.g., a writable read-only memory (ROM)), a hard disk, or another type of storage medium.

The exemplary CA 40 of FIG. 1 can be preprogrammed or it can be programmed (and reprogrammed) by loading a program from another source (e.g., from a CD-ROM, from another computer device through a data network, or in another manner). The I/O controller can be coupled to input/output devices (e.g., a monitor, a keyboard) and to the network 15. The input/output devices receive and transmit data in analog or digital form over communication links such as a serial link, wireless link (e.g., infrared, radio frequency), parallel link, or another type of link. The memory can store instructions (e.g., computer code) associated with computer applications, programs and computer program modules, and other resources. The memory can also store application data and data objects that can be interpreted by applications, programs, modules, or virtual machines running on the CA 40. The memory can store additional information, for example, files and instruction associated with an operating system, device drivers, archival data, or other types of information. The processor can execute instructions to generate output data based on data inputs. For example, the processor can run applications and programs by executing or interpreting software, scripts, functions, executables, and other types of computer program modules. The input data received by the processor and the output data generated by the processor can be stored in a computer-readable medium, such as the memory or a storage device.

The network 15 can include any collection of terminals, links and nodes which connect to enable communication between users of terminals. For example, the network 15 can include a wireless or wired network, a cellular network, a telecommunications network, an enterprise network, an application-specific public network, a Local Area Network (LAN), a Wide Area Network (WAN), a private network, a public network (such as the Internet), a WiFi network, a network that includes a satellite link, or another type of communication network. The network 15 can include a tiered structure defined by firewalls or similar features that implement various levels of security. The network 15 may comprise of various nodes such as servers, gateways, or routers.

Communication devices 20 are computing devices that can communicate over the communication network 15 based on communication schemes specified by the cryptography system. The communication devices 20 are generally operable to receive, transmit, process, and store information. The communication devices 20 typically include a data processing apparatus, a data storage medium, and a communication interface.

In some implementations the signer can be one of the source servers 10, for instance an agency distributing the message. In other implementations the signer can be a centralized entity that collects messages from a number of source servers 10, such as network server 30. In the example where the notification is a warning message, the source servers 10 may each correspond to an organization responsible for identifying a warning condition such as a weather event, earthquake, fire, etc., and the network server 30 can be a central broadcast entity that receives messages from a plurality of different organizations, and processes their messages to generate the notification that may be broadcast to the communication devices 20.

In an implementation, a message generated by a message source, such as source server 10, is processed to produce a notification that may be broadcast out to the communication devices 20. In order to ensure the integrity and authenticity of the message, the processing includes a message signer allocating a message counter value for the message, signing the message and message counter value, and generating an indication of the message signer. The indication may comprise, for instance a certificate or implicit certificate. The message, signature, message counter value, and indication may be packaged into the notification for broadcast to the communication devices 20. In the implementation, the message counter value may replace a message timestamp that might normally be present.

In an implementation the signature is generated using the message signer's private key, the message, and the message counter value. In some implementations, the signature may further be generated using the indication, such as an implicit certificate corresponding to the message signer's private key. In this fashion, the signature may be said to be based on the message and the message counter value, and in some implementations further based upon the indication.

In an implementation, the message counter value allocated by the message signer is further associated with an identity of a CA 40 that corresponds to the indication. Accordingly, when allocating the message counter value for a message, the message signer would allocate a value next in sequence based upon the preceding message counter value used for a previous message sent by that message signer and secured by an indication from the same CA 40. In this fashion, the message signer would maintain a separate counter sequence for each CA 40 that it might use when signing messages.

After signing the message and the message counter value, the message signer may then broadcast, either directly or through an intermediary, the notification that includes the message, the message counter value corresponding to the signer, the signature signed by the signer and based on the message and the message counter value, and the indication of the signer, such as a certificate or implicit certificate, over the network to the communication devices 20.

The signer public key corresponding to the signer private key used by the signer is identified by the indication of the signer, and may be used by a recipient, such as one of the communication devices 20, to identify the signer and verify the signature. Typically, the CA 40 may be used by the communication devices 20 in the verification process. For instance, the communication device 20 may obtain a certificate authority public key to process the indication to obtain the signer's public key. Typically, the indication may comprise a certificate or implicit certificate issued by the CA 40 for that signer.

Before accepting the verified notification, the recipient can obtain additional information regarding the message by confirming that this is a valid up to date message sent by the signer. The recipient obtains this additional confirmation by comparing the message counter value with a current counter value maintained by the recipient and associated with the message signer. The identity of the message signer may be obtained based upon the indication of the signer. In these implementations, the recipient stores a current counter value and associates the stored current counter value with the identity of the signer.

In some implementations, as explained above, the message counter value allocated by the message signer may further correspond with the CA 40 that provided the indication. Typically, the message counter value will further correspond to the certificate issued by the CA 40, so that when a new certificate is issued, a new counter sequence will be initiated.

In these implementations, a message current counter value is stored and associated with both the identity of the signer and the CA 40. Accordingly, the communication device 20 may maintain a plurality of current message counter values stored in association with each signer, each of the plurality of current message counter values associated with that signer corresponding to the issuing CA 40, and/or certificate associated with that signed message. The communication device 20 may process the indication, for example a certificate or implicit certificate, to obtain an identity of the signer and an identity of the CA 40. The communication device 20 may then obtain the current message counter value based on both the signer identity and the certificate authority identity (or specific certificate as the case may be).

The current message counter value may be, for example, retained in a memory of the communication device 20, or may be available to the communication device 20 over the network 15. Typically the current message counter value is a message counter value of an earlier notification that was previously stored by the communication device 20.

In some implementations, the comparison may proceed by determining whether the message counter value is greater than the current message counter value, and if the message counter value is greater than the current message counter value, then the communication device 20 accepts the received notification as it has some confirmation that this is a new notification, and not a previously broadcast notification. The comparison may require that the message counter is greater than the stored current message counter where it is desirable to confirm that this is a new message not previously received by the communication device 20.

In some implementations, the comparison may proceed by determining whether the message counter value is greater than or equal to the current message counter value, and if the message counter value is greater than or equal to the current message counter value, then the communication device 20 accepts the received notification as it has some confirmation that this is a current notification, and not an out of date previously broadcast notification. The comparison may require that the message counter is greater than or equal to the stored current message counter where it is desirable to confirm, for instance, that this message relates to a current message being broadcast. In an implementation, this comparison may be used, for instance, where it is desirable to send and have a series of messages received by the communication device 20 as part of the communication strategy. When a condition changes, the next message may institute a new message counter value, such that the messages relating to the previous condition are no longer accepted by the communication device 20.

In implementations where the indication is a certificate or implicit certificate, the identity of the signer and the identity of the CA 40 may be obtained by processing the certificate or implicit certificate, as known for standard certificate verification procedures.

The public key used to verify the signature of the warning messages may be distributed to the communication devices 20 so as to maintain trust, i.e., the communication devices 20 must be assured that the public key is associated with the identity of the message signer (the owner of the private key used to generate the signature of the warning messages). This trust may allow for improved protection against false warning messages, for example, from unauthorized sources.

As indicated above, in an implementation an indication counter value may be used. The indication counter value being directly associated with the indication, such as the certificate or implicit certificate corresponding to the message signature. Implementation of the indication counter value is similar to that of the message counter value described above, except that the indication counter value is always associated with both the message signer identity and the indication identity (i.e. the identity of the CA 40). The indication counter value is preferably located within the indication, and for instance may replace a certificate timestamp that may normally be included.

It is noted that for the indication counter value, it is preferred to limit the comparison to determining whether the indication counter value is greater than or equal to the stored current indication counter value. This is preferred as it is common practice to re-use the certificates for a period of time, and it would be preferred to only change the indication counter value when the certificate or implicit certificate is updated.

In an implementation where both a message counter value and an indication counter value are included in the message, the recipient communications device 20 may adopt different procedures to confirm the authenticity of received messages. For instance, for the first message received, the communication device 20 may confirm that both the message counter value and the indication counter value are up to date. For subsequent messages the communication device 20 may choose to only confirm the message counter value, for instance, provided that it is able to verify that the public key derived from the indication is the same as a previous public key. In this fashion, the communication device 20 may skip confirming the indication counter when it is determined that the implicit certificate is a current implicit certificate and unchanged from the previously received implicit certificate.

Figure 3A:
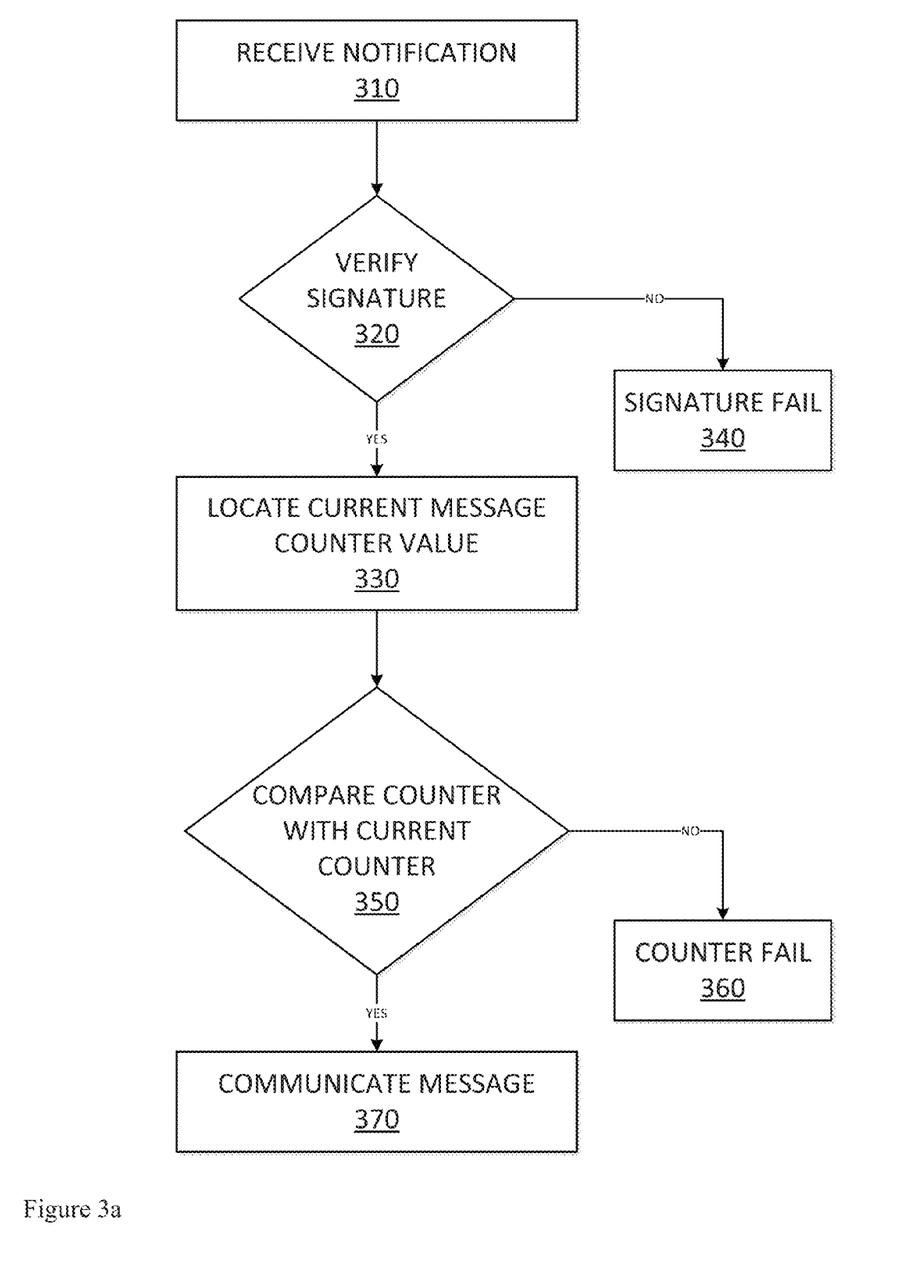
FIG. 3a illustrates, in flow diagrams, an exemplary method at a communication device.
Figure 3B:
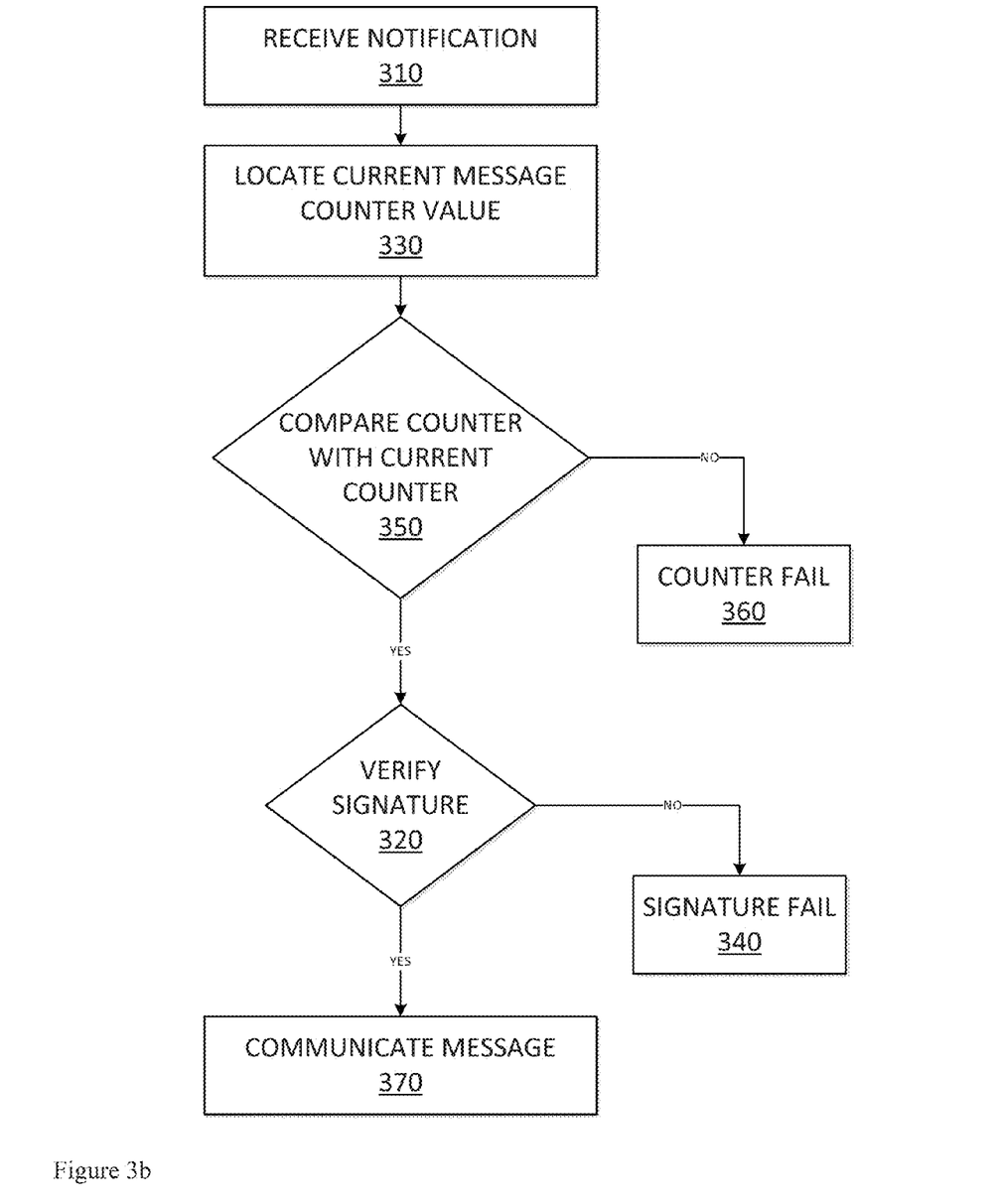
FIG. 3b illustrates, in flow diagrams, an exemplary method at a communication device.
Figure 3C:
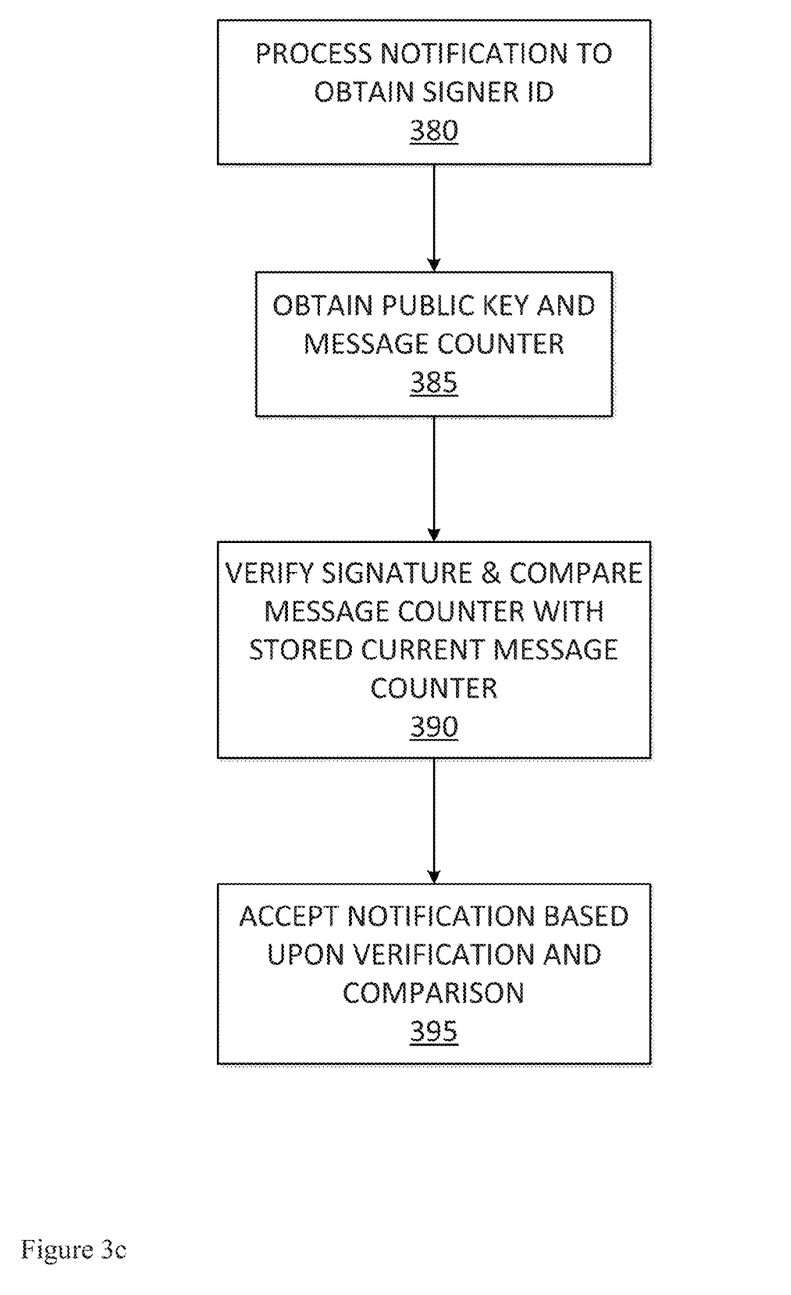
FIG. 3c illustrates, in flow diagrams, an exemplary method at a communication device.

FIGS. 3a to 3c provide illustration of exemplary steps to be taken by a communication device 20 when confirming a message using a message counter value. Similar steps may be taken for confirming the message using the indication counter value, or a combination of the message counter value and the indication counter value. Essentially, each decision step evaluates either the message counter value, the indication counter value, or both the message counter value and the indication counter value.

FIG. 3a shows an exemplary method that can be performed by a communication device 20, in accordance with an aspect of the disclosure. The communication device 20 receives a notification, such as a warning message, comprising a message, message counter, signature and an indication of the message signer such as a certificate or implicit certificate at 310.

The communication device 20 verifies the signature, at 320, using a public key associated with the indication of the message signer. The communication device 20 may employ a variety of known certificate authentication schemes to generate a public key from security information derived from the indication of the message signer included with the warning message. For instance, the communication device 20 may obtain the message signer's public key, by contacting the CA 40 and identifying the message signer using the indication of the message signer to obtain the corresponding message signer's public key. Alternatively, the communication device 20 may retain a certificate authority public key in persistent memory associated with the CA 40. In this implementation, the communication device 20 may regenerate the public key of the message signer from the certificate authority public key and the certificate authority public key reconstruction value included with the implicit certificate of the indication.

In an implementation, the indication of the message signer may comprise an implicit certificate of the message signer. The communication device 20 may reconstruct the public key of the message signer using the implicit certificate. The public key of the message signer signaling an identity of the message signer.

If the signature verification fails, the communication device 20 may execute a failed signature verification function, at 340, which may include notifying the CA 40, notifying the source server 10 or network server 30, and/or displaying a message to a user of the device 20 indicating the failed signature verification.

If the signature verification succeeds, the communication device 20 locates a stored current message counter value for the message signer, at 330, using at least an identity of the message signer. In an aspect, the communication device 20 may maintain a message counter store that stores at least a current message counter for each message signer. The current message counter being the message counter associated with the most recent communication received from that message signer. For instance, where the indication of the message signer comprises an implicit certificate, the communication device 20 may reconstruct the public key of the message signer using the implicit certificate, and use the reconstructed public key to identify the message signer and locate the current message counter for that message signer.

Depending upon the protocol, test messages, maintenance messages and warning messages may each be provided with an incremental counter value for each message signer. Alternatively, only some of the messages, such as only test messages and warning messages, may include the incremental message counter value. The store of counters includes a reference or pointer to associate each message counter with its corresponding message signer. As messages are received and verified, the message counter store may be updated so the current message counter value in the store reflects the most recent message received and verified by the communication device 20. In some implementations, a maintenance message may be used to increment some or all of the stored current message counters associated with a message signer.

Depending upon the form of the indication of the message signer, and the structure of the message counter store, locating the current message counter for the message signer may be a direct comparison of the indication of the message signer to the reference. Alternatively, the communication device 20 may need to process the indication of the message signer in order to identify the corresponding reference. For instance, the indication may comprise an implicit certificate, and the communication device 20 may need to process the implicit certificate to identify the message signer and corresponding reference.

After locating the current message counter value for the message signer, the communication device 20 compares the message counter value from the warning message with the stored current message counter value associated with the signer to determine whether the message is valid.

In some implementations, the comparison comprises determining whether the received message counter value is greater than the stored current message counter value. If the message counter value is not greater than the current message counter value, then the communication device 20 has already processed the warning message, and accordingly executes a counter fail function at 360. In some implementations, the comparison comprises determining whether the received message counter value is greater than or equal to the stored current message counter value. If the counter value is not greater than or equal to the current counter value, then the warning message is not considered to be authenticated, and accordingly the communication device 20 executes the counter fail function at 360.

The counter fail function, at 360, may provide for different actions depending upon the circumstances. In an implementation, the counter fail function communication device 20 may simply discard the warning message. In another implementation, the counter fail function 360 may keep but flag messages where the counter value is equal to the current counter value, to alert the user of a possibility of a repeated message.

In a further implementation, the counter fail function 360 may keep but differentially flag messages that identifies a state of the counter value in order to distinguish between cases where the counter value is one of: less than the current counter value, equal to the current counter value, and greater than the current counter value. In the further implementation the user is empowered to accept or ignore the messages based upon the differential flags, but messages are still displayed to the user for review.

If the comparison of the counter value with the current counter value is successful, the communication device 20 may proceed to communicate the message to the user, such as through a display message function, at 370. The display message function communicates the message to the user, for instance by sounding a tone, replaying a recording, displaying text or images on a screen, or some other output for communicating information to a user of the communication device 20. The display message function may further update the message counter store to update the stored current message counter value with the message counter value from the message.

When a counter has run through all available bits, the signer may assign itself a new 'identity' with a counter value of 0, for instance by requesting a new implicit certificate from the CA 40.

When the communication device 20 receives a message for which there is no corresponding signer or CA 40 identified in its current counter store, the communication device 20 may initiate a new stored current counter value for that signer. In an implementation, the default stored current counter value for new signers may be "0". In this case, the comparison of the first message would always be accepted, and the current counter store would be updated to the counter value in that first message.

In an implementation, in specific locations where there is expected to be a large number of new arrivals, for instance an airport, regular maintenance messages may be broadcast locally to update communication devices 20 with the current counter value before they leave the location. The implementation provides some surety that a large number of communication devices 20 physically entering a network at a local location, and that are out of date, will be updated before they roam to the network at large.

FIG. 3b shows an alternate method for execution by the communication device 20 in which the device first locates the current message counter for the message signer, at 330, and compares the message counter with a current message counter value, for instance to check to confirm whether the message counter is greater than the current counter, at 350, before verifying the signature, at 320. As will be appreciated, while both the message counter check and the signature check must occur to complete the communicate message function at 370, it is possible for the communication device 20 to perform the message counter check and the signature check in either order.

FIG. 3c shows an exemplary method that can be performed by a communication device 20. The device 20 processes an indication from a received notification to obtain a signer identity at step 380. The public key and a stored current message counter value are obtained based upon the signer identity at step 385. The signature is verified using the indication, and the message counter is compared with the current counter value at step 390. The notification is accepted based upon the successful verification and comparison at step 395.

While the above methods are described with reference to the message counter in particular, it is understood that the same procedure may be applied to embodiments that employ an indication counter, as well as embodiments that employ a message counter and an indication counter. In these embodiments the methods described above may be adapted by employing the indication counter, or a combination of a message counter and an indication counter, in place of the message counter described above.

Figure 4:
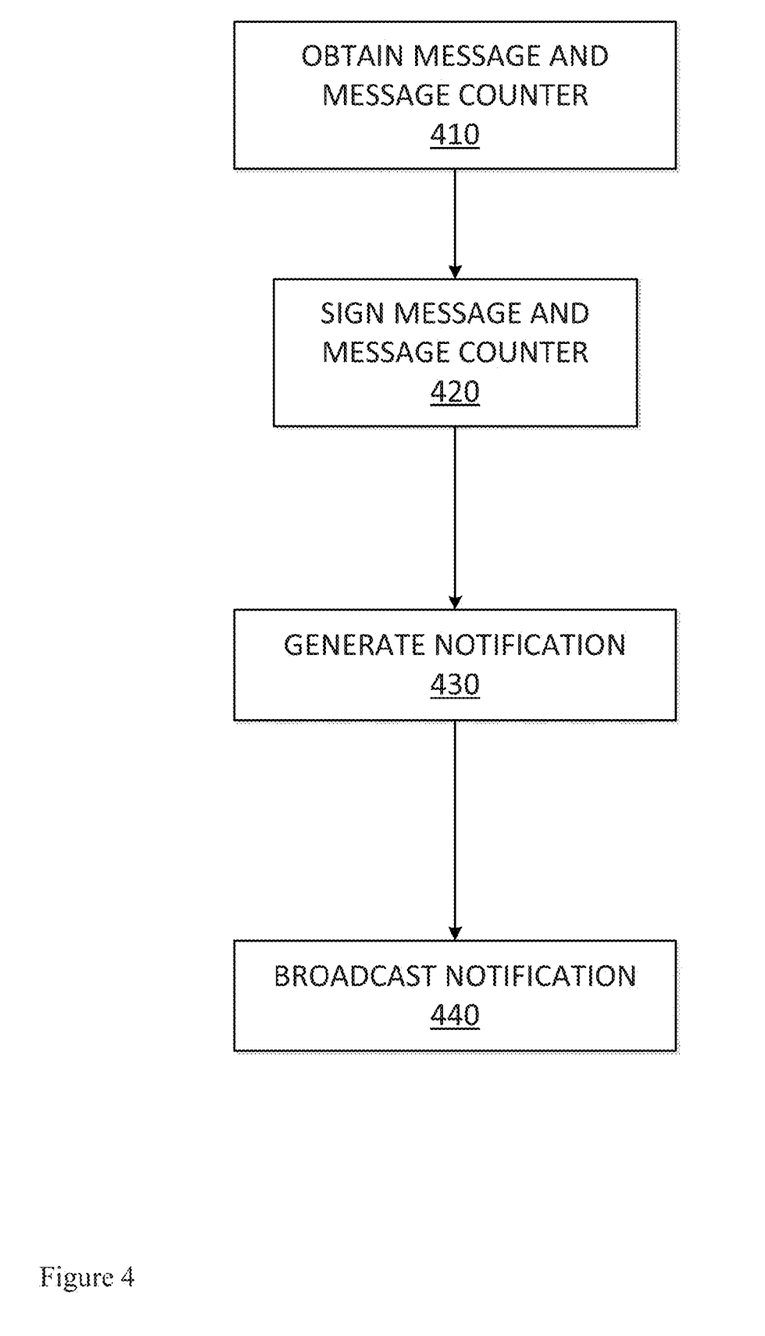
FIG. 4 illustrates, in a flow diagram, an exemplary method at a server.

FIG. 4 shows an exemplary method that can be performed by a server, source server 10 or network server 30, to generate a notification in accordance with an aspect of the disclosure. The server 10, 30 obtains a message and a message counter at step 410. The message may, for instance, comprise a warning initiated by a warning service.

As discussed above, in an implementation a source server 10 may be operative to generate the message, and sign the message and message counter to create the signed message.

As further discussed above, in an alternate implementation the source server 10 may provide a message to a network server 30. In the implementation the network server 35 obtains at least the message from the source server 10, and may either receive a counter value from the source server 10, or the network server 30 may generate the counter value.

The server 10, 30, as message signer, signs the message and message counter using a private key, at 420. The server 10, 30 generates a notification comprised of the signed message and message counter, the signature, and an indication of the message signer at 430. The indication of the message signer comprising information sufficient for a recipient to obtain or generate a public key of the message signer corresponding to the private key of the message signer. In an implementation, the indication of the message signer comprises an implicit certificate of the message signer. In an implementation, the indication of the message signer comprises a certificate of the message signer.

The server 10, 30 then broadcasts the notification, at 440, to the communication devices 20. As will be appreciated, while the method is described in terms of a single server performing all steps of the method, some or all of the steps may be distributed across multiple computing devices depending upon specific system requirements.

In accordance with the above described methods, a system for generating and distributing notifications such as warning messages is provided that does not require the synchronization of counters or time stamps between a central server and remote communication devices. In executing the above methods, the communication devices 20 each maintain in a store their own current message counter value associated with a message signer based upon messages received from the message signer, and/or their own current indication counter value associated with an indication of the message signer such as a certificate or implicit certificate. If a communication device 20 is out of contact with the message server, for instance by being disconnected from the network 15 while roaming or being turned off, the current counter value(s) associated with the message signer retained in the store may lag the counters being distributed by the server 10, 30. Upon receiving a next message, the communication device 20 will update the current counter value(s) retained in the store.

Unlike prior art methods, the present approach provides a flexible system that allows for some security against replay attacks that is intended to be sufficient to prevent mass panic since a majority of communication devices 20 will reject a replay attack.

Furthermore, implementation of the method allows for automatic filtering of repeated messages. In many warning broadcasts, a same message will be repeated multiple times to ensure delivery of the warning message. According to the above methods, once a communication device 20 has received a notification such as a warning message, subsequent repeated messages will be identified as repeated messages. In an implementation, the message counter fail function 360 may further comprise communicating the warning message to the user, along with a flag to identify the message as a repeated message. In an implementation, every warning message communicated to the user may further comprise identification of either the message counter value or a representation of the message counter value. Accordingly, when communicating a repeated warning message to the user, the communications device 20 may communicate both the current message counter value, or representation, and the message counter value, or representation, of the repeated message to the user. In this manner, the user is provided with additional information to determine whether the message is simply a delayed warning message, and the warning is still actionable, or if the message is a replay attack and should be discarded.

In cases where an indication counter is utilised, the communication device 20 may distinguish between repeated messages employing the same indication and having the same indication counter value as the current indication counter value, and old or invalid messages that include indication counter values smaller than the current indication counter value.

In an implementation where the communication device 20 maintains a store of received warning messages, the message counter fail function 560 may further comprise associating the counter value of the repeated message with a previously received counter value and associated previously received message. The computing device 20 may then communicate the repeated warning message and at least a portion of the previously received message to the user. In an aspect, the communication device 20 may re-format the messages to communicate the meta data for the messages as a comparator, along with the message itself, to the user. The meta data may include, for instance, a message date/time stamp, either contained in the message itself, or having been previously created by the communication device 20 when the previously received message was stored. In this manner, the user is provided with additional information to determine whether the message is simply a delayed warning message, and the warning is still actionable, or if the message is a replay attack and should be discarded.

In an implementation, the message counter fail function 360 may further comprise reformatting the repeated warning message to include both a current (local) time, and potentially a current time zone, as well as a message time, and potentially a time zone, of the repeated warning message from the signed message meta data. In this manner, by communicating both the current time and the message time to the user when a message counter is repeated, the user is provided with additional information to determine whether the message is simply a delayed warning message, and the warning is still actionable, or if the message is a replay attack and should be discarded.

In an implementation, the server 10, 30 may change the public key in order to identify a 'new' message signer to re-fresh a message counter value or an indication counter value. Accordingly, the server 10, 30 may periodically change its private and public keys, forcing a re-set of the message counter value and/or the indication counter value along with a new message signer identity. Depending upon a periodicity of the private and public key change, the server 10, 30 may further secure warning messages from replay attack as all prior messages and counter values will effectively be discarded since each counter is associated with a message signer.

Communication device 20 can each include memory, a data processor, an input/output controller, user interface(s) (for example, a monitor, a touchscreen, mouse, or keyboard), and are operative to interface with the network 15. The memory of the communication device 20 can store messages and information associated with the cryptography system. For example, a communication device 20 may store the public and private key data, digital certificate data, and other types of information. The memory of the communication device 20 can store instructions (e.g., computer code) associated with computer applications, programs and computer program modules, and other resources. Communication devices 20 can include handheld devices such as smart phones, personal digital assistants (PDAs), portable media players, laptops, notebooks, tablets, and others. They may also include work stations, mainframes, non-portable computing systems, devices installed in structures, vehicles, and other types of installations.

Figure 5:
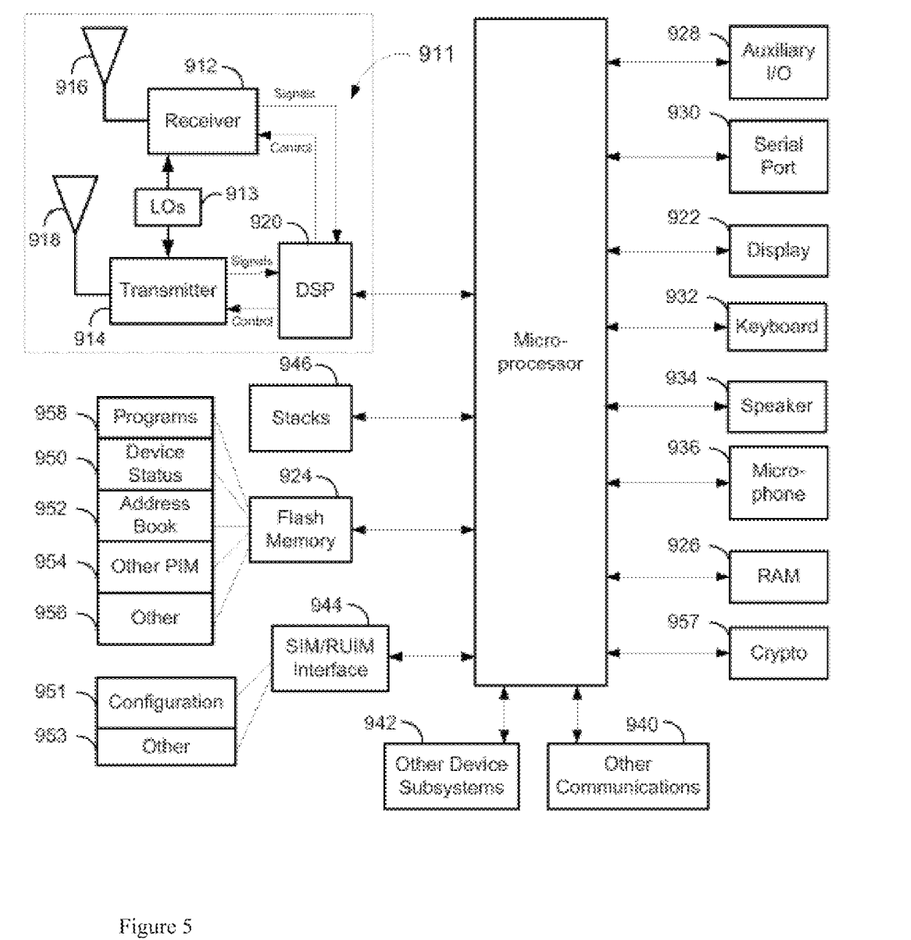
FIG. 5 is a block diagram illustrating a mobile communication device.

FIG. 5 is a block diagram illustrating a mobile device, which can act as a communication device 20 and can co-operate with the apparatus and methods described above, and which is an exemplary wireless communication device 20. Mobile device 900 is preferably a two-way wireless communication device having voice and/or data communication capabilities. Mobile device 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and processing means such as a processing module such as a digital signal processor (DSP) 20. As will be apparent to those skilled in the field of communications, the particular design of the communication subsystem 911 will be dependent upon the communication network in which the device is intended to operate. For example, mobile device 900 may include a communication subsystem 911 designed to operate within the Mobitex™ mobile communication system, the DataTAC™ mobile communication system, GPRS network, UMTS network, EDGE network or LTE network.

Network access requirements will also vary depending upon the type of network 902. For example, in the Mobitex and DataTAC networks, mobile device 900 is registered on the network using a unique identification number associated with each mobile device. In LTE, UMTS and GPRS networks, however, network access is associated with a subscriber or user of mobile device 900. A GPRS mobile device therefore requires a subscriber identity module (SIM) card in order to operate on a GPRS network. Without a valid SIM card, a GPRS mobile device will not be fully functional. Local or non-network communication functions, as well as legally required functions (if any) such as "911" emergency calling, may be available, but mobile device 900 will be unable to carry out any other functions involving communications over the network 902. The SIM interface 944 is normally similar to a card-slot into which a SIM card can be inserted and ejected like a diskette or PCMCIA card. The SIM card can have approximately 64 K of memory and hold many key configuration 951, and other information 953 such as identification, and subscriber related information.

When required network registration or activation procedures have been completed, mobile device 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920. In the 3GPP environment, the single transmission may be broadcast to the communication devices within a certain geographical area (also known as Notification Area) using the Cell Broadcast Channel (CBCH).

The mobile device may include a cryptographic module 957 that is operable to perform the various operations described above. The cryptographic module may perform one or more of the various steps for verification of the signature of the warning message. The cryptographic module may allow for representation of the elliptic curve points in different formats and may perform various conversion operations for converting among the different formats and other routines for checking the validity of each format. For example, an ECC scheme may specify a bit string format, an elliptic curve point format, an octet string format, an integer format, a field element format, and others. Correspondingly, other entities of the system of FIG. 3 such as CA 40 and the message signer servers (10 or 35) may also include cryptographic modules configured to perform various cryptographic operations such as described above.

Mobile device 900 preferably includes processing means such as a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 935, keyboard 932, speaker 934, microphone 936, a short-range communications subsystem 940 and any other device subsystems generally designated as 942.

Some of the subsystems shown in FIG. 7 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile device. A predetermined set of applications that control basic operations, including at least data and voice communication applications for example, will normally be installed on mobile device 900 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile device user's corresponding data items stored or associated with a host computer system. Further applications may also be loaded onto the mobile device 900 through the network 902, an auxiliary I/O subsystem 928, serial port 935, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile device 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile device 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile device 900 is similar, except that received signals would preferably be output to a speaker 934 and signals for transmission would be generated by a microphone 936. Alternative voice or audio I/O subsystems, such as a voice message recording subsystem, may also be implemented on mobile device 900. Although voice or audio signal output is preferably accomplished primarily through the speaker 934, display 922 may also be used to provide an indication of the identity of a calling party, the duration of a voice call, or other voice call related information for example. The display 922 may also be used to provide the warning messages to the user of the mobile device. As noted before, in some implementations, the warning message may be displayed only if the verification of the signature of the warning message is successful. In other implementations, at least a portion of the warning message is displayed even if the verification of the signature is unsuccessful or incomplete. The warning message may be displayed upon reception without any user interaction.

Serial port 930 would normally be implemented in a mobile device for which synchronization with a user's desktop computer (not shown) may be desirable, but is an optional device component. Such a port 930 would enable a user to set preferences through an external device or software application and would extend the capabilities of mobile device 900 by providing for information or software downloads to mobile device 900 other than through a wireless communication network. The alternate download path may for example be used to load the CA's public key through a direct and thus reliable and trusted connection to thereby enable secure device communication.

Other communications subsystems 940, such as a short-range communications subsystem, is a further optional component which may provide for communication between mobile device 900 and different systems or devices that are similarly enabled, which need not necessarily be similar devices. For example, the subsystem 940 may include an infrared device and associated circuits and components or a Bluetooth™ communication module.

Furthermore it will be noted that the apparatus described herein may comprise a single component such as a mobile device or other user equipment or access network components, a combination of multiple such components for example in communication with one another or a sub-network or full network of such components.

Some of the specific implementations may have been described herein in relation to 3GPP specifications. However the method and apparatus described are not intended to be limited to the specifications or the versions thereof referred to herein but may be applicable to future versions or other specifications.

Subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on non-transitory computer storage medium for execution by, or to control the operation of, data processing apparatus. Alternatively or in addition, the program instructions can be encoded for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple cards, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD- ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

While this specification contains many specific implementation details, these should not be construed as limitations on the scope of what may be claimed, but rather as descriptions of features specific to particular implementations. It will, however, be evident that various modifications and changes may be made thereto without departing from the scope of the technique. The specification and drawings are, accordingly, to be regarded in an illustrative rather than a restrictive sense. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of accepting a notification, the method comprising:
   receiving the notification, the notification containing a message, a counter value, a signature and an indication of a signer, the counter value including a message counter value and the indication including an indication counter value and a certificate authority identity;
   processing the indication to obtain a signer identity corresponding to the signer;
   obtaining, based on the signer identity, a previously stored current counter value associated with the signer, the current counter value including a current message counter value;
   obtaining, based on the signer identity and the certificate authority identity, a previously stored current indication counter value associated with the signer identity and the certificate authority identity;
   comparing the counter value of the notification with the current counter value and the indication counter value of the notification with the current indication counter value; and
   accepting the received notification based upon the comparisons.

2. The method of claim 1 wherein the counter value comprises a certificate counter value, and wherein the indication comprises the certificate counter value and a certificate authority identity corresponding to the certificate authority that generated the certificate counter value, and wherein the stored current counter value is further associated with the certificate authority identity, and wherein the method further comprises:
   processing the indication to obtain the certificate authority identity; and,
   wherein the obtaining the current counter value comprises obtaining, based on the signer identity and the certificate authority identity, the previously stored current counter value.

3. The method of claim 1, wherein the comparing comprises confirming that the message counter is greater than the current message counter, and confirming that the indication counter is greater than or equal to the current indication counter.

4. The method of claim 1 wherein the processing the indication to obtain a signer identity comprises processing the indication to obtain public key information associated with the signer, and wherein the obtaining, based on the signer identity, comprises obtaining based on the public key information.

5. The method of claim 1 further comprising, when the notification is accepted:
processing the indication to obtain public key information; and
verifying the signature using the public key information to authenticate the notification.

6. The method of claim 4 further comprising discarding the notification if the signature is not verified.

7. The method of claim 1 further comprising discarding the notification if the received notification is not accepted.

8. The method of claim 1 wherein the indication comprises a certificate or an implicit certificate.

9. The method of claim 1, wherein the comparing the counter value and the current counter values comprises verifying that the counter value is equal to or greater than the current counter value.

10. The method of claim 9 further comprising if the comparison fails, discarding the notification.

11. The method of claim 1, wherein the comparing the counter value and the current counter values comprises verifying that the counter value is greater than the current counter value.

12. The method of claim 11 further comprising if the comparison fails, discarding the notification.

13. The method of claim 1, wherein the certificate is an ECQV implicit certificate.

14. The method of claim 1, wherein the signature is one of a keyed MAC signature, DSA signature, and an ECDSA signature.

15. The method of claim 1, wherein when the received notification is accepted based upon the comparison, the method further comprising replacing the current counter value with the received counter value.

16. The method of claim 1, wherein the received notification is a warning message.

17. The method of claim 1, wherein after the received notification is accepted, the method further comprising: communicating the message to a user.

18. The method of claim 1, wherein when the counter value fails the comparison with the current counter value, the method further comprises discarding the received notification.

19. The method of claim 1, further comprising if the comparison fails, communicating the message to a user, and including a flag identifying the comparison failure.

20. The method of claim 1, further comprising communicating the message to a user with a differential flag identifying a state of the counter value as determined by the comparison.

21. A computing device including a processor and memory operative to execute the method of claim 1.

22. A software program product comprising a non-transitory machine readable medium comprising instructions that when executed on a processor of a computing device enable the computing device to perform the method of claim 1.

* * * * *